(12) United States Patent
Grifoni et al.

(10) Patent No.: US 9,977,461 B2
(45) Date of Patent: May 22, 2018

(54) WEARABLE MOBILE DEVICE

(71) Applicant: Rufus Armor, LLC, Los Angeles, CA (US)

(72) Inventors: Gabriel Grifoni, Los Angeles, CA (US); Travis LaBerge, Boulder, CO (US); Matthew Goldman, New York, NY (US)

(73) Assignee: Rufus Labs, Inc., West Hollywood, CA (US)

( * ) Notice: Subject to any disclaimer, the term of this patent is extended or adjusted under 35 U.S.C. 154(b) by 55 days.

(21) Appl. No.: 14/194,189

(22) Filed: Feb. 28, 2014

(65) Prior Publication Data

US 2014/0295918 A1  Oct. 2, 2014

Related U.S. Application Data

(60) Provisional application No. 61/771,739, filed on Mar. 1, 2013.

(51) Int. Cl.
| | |
|---|---|
| *G06F 1/16* | (2006.01) |
| *H04M 1/00* | (2006.01) |
| *H04M 1/725* | (2006.01) |
| *H04B 1/3827* | (2015.01) |

(52) U.S. Cl.
CPC ............. *G06F 1/163* (2013.01); *H04B 1/385* (2013.01); *H04M 1/7253* (2013.01); *H04B 2001/3861* (2013.01)

(58) Field of Classification Search
CPC . G06F 1/163; H04B 1/385; H04B 2001/3855; H04B 2001/3861

USPC ............... 361/679.03; 455/575.6; 368/10, 13
See application file for complete search history.

(56) References Cited

U.S. PATENT DOCUMENTS

| | | | |
|---|---|---|---|
| D199,195 S | 9/1964 | Michelotti et al. | |
| 3,729,923 A | 5/1973 | Brigliano et al. | |
| 4,194,355 A | 3/1980 | Nishida | |
| 4,769,656 A | 9/1988 | Dickey | |
| 4,941,236 A * | 7/1990 | Sherman ............... | A44C 5/2071 24/265 WS |
| 5,144,599 A | 9/1992 | Blaich et al. | |
| 5,235,560 A | 8/1993 | Seager | |
| D345,736 S | 4/1994 | Scheid | |
| D365,550 S | 12/1995 | Houlihan | |
| D366,036 S | 1/1996 | Houlihan | |

(Continued)

FOREIGN PATENT DOCUMENTS

CN      201113841 Y  *  9/2008

OTHER PUBLICATIONS

"Smile smartwatch (CODE emopulse)", lbsmadushanka.blogspot. com<http://lbsmadushanka.blogspot.com/2013/08/emopulse-smilesmartwatch.html>, (Aug. 19, 2013).

(Continued)

*Primary Examiner* — Nidhi Thaker
(74) *Attorney, Agent, or Firm* — Tsircou Law, P.C.

(57) ABSTRACT

A mobile device is provided that includes a display module that detachably couples to a wrap module. The interconnection between the wrap module and the display module provides data and/or power conductivity there between. In this manner, the wrap module can provide supplemental functionality, such as serving as an input device (touch), a power source, or a solar charger, among other features.

19 Claims, 19 Drawing Sheets

(56) References Cited

U.S. PATENT DOCUMENTS

| | | | |
|---|---|---|---|
| 5,615,179 A * | 3/1997 | Yamamoto | G04G 17/083 224/168 |
| 5,762,241 A | 6/1998 | Cross | |
| 5,769,290 A | 6/1998 | Pestana | |
| 5,872,744 A * | 2/1999 | Taylor | G04G 17/083 224/164 |
| 5,889,737 A | 3/1999 | Alameh et al. | |
| D413,817 S | 9/1999 | Ando et al. | |
| 6,151,968 A | 11/2000 | Chou | |
| D434,675 S | 12/2000 | Ando et al. | |
| 6,192,253 B1 | 2/2001 | Charlier et al. | |
| 6,212,414 B1 | 4/2001 | Alameh et al. | |
| 6,249,487 B1 | 6/2001 | Yano et al. | |
| D454,551 S | 3/2002 | Bonadei et al. | |
| D454,765 S | 3/2002 | Jansson | |
| D460,430 S | 7/2002 | Wada et al. | |
| 6,536,941 B1 | 3/2003 | Fang | |
| 6,619,835 B2 * | 9/2003 | Kita | A44C 5/0015 368/10 |
| 6,707,764 B2 | 3/2004 | Davidson et al. | |
| D491,474 S | 6/2004 | Wong | |
| 6,753,882 B2 | 6/2004 | Nakazawa et al. | |
| D493,371 S | 7/2004 | Streltsov | |
| D496,590 S | 9/2004 | Chung et al. | |
| 6,854,978 B2 | 2/2005 | Noirjean | |
| D508,031 S | 8/2005 | Kim et al. | |
| D508,738 S | 8/2005 | Lodato et al. | |
| 6,970,157 B2 | 11/2005 | Siddeeq | |
| 7,006,408 B2 | 2/2006 | Chen | |
| 7,019,702 B2 * | 3/2006 | Henriet | H01Q 1/273 343/718 |
| D523,769 S | 6/2006 | Arlanda | |
| D545,220 S | 6/2007 | Leung | |
| D549,221 S | 8/2007 | Yagi | |
| 7,345,954 B2 | 3/2008 | Ehrsam et al. | |
| 7,398,151 B1 | 7/2008 | Burrell et al. | |
| 7,455,525 B2 | 11/2008 | Rambosek et al. | |
| D586,823 S | 2/2009 | Anderson et al. | |
| D589,375 S | 3/2009 | Tang | |
| 7,529,155 B2 | 5/2009 | Fasciano | |
| D596,610 S | 7/2009 | Hou | |
| D599,108 S | 9/2009 | Brandenburg | |
| 7,618,260 B2 * | 11/2009 | Daniel | A44C 5/0007 24/311 |
| 7,745,717 B2 | 6/2010 | Sasaki et al. | |
| 7,828,697 B1 | 11/2010 | Oberrieder et al. | |
| 7,843,769 B2 | 11/2010 | Ishida et al. | |
| D637,094 S | 5/2011 | Cobbett et al. | |
| 8,040,758 B1 | 10/2011 | Dickinson | |
| 8,098,141 B2 * | 1/2012 | Vanska | G06F 1/163 340/407.1 |
| 8,099,794 B2 | 1/2012 | Carstens | |
| D660,185 S | 5/2012 | Schrepfer | |
| D664,564 S | 7/2012 | Gillett et al. | |
| 8,275,327 B2 | 9/2012 | Yi et al. | |
| 8,279,716 B1 | 10/2012 | Gossweiler, III et al. | |
| 8,467,270 B2 * | 6/2013 | Gossweiler, III | G04G 17/06 345/173 |
| 8,562,489 B2 | 10/2013 | Burton et al. | |
| 2002/0105859 A1 | 8/2002 | Davidson et al. | |
| 2003/0197678 A1 | 10/2003 | Siddeeq | |
| 2003/0221449 A1 | 12/2003 | DeShong et al. | |
| 2004/0081025 A1 | 4/2004 | Chen | |
| 2005/0276164 A1 | 12/2005 | Amron | |
| 2006/0012566 A1 | 1/2006 | Siddeeq | |
| 2007/0091730 A1 | 4/2007 | Ting | |
| 2007/0246494 A1 | 10/2007 | Kim et al. | |
| 2007/0270199 A1 | 11/2007 | Kim et al. | |
| 2008/0114217 A1 * | 5/2008 | Suyama | A61B 5/02055 600/300 |
| 2009/0156255 A1 * | 6/2009 | Shin | H04B 1/385 455/558 |
| 2009/0175130 A1 | 7/2009 | Hilfiker | |
| 2009/0177129 A1 | 7/2009 | Chan et al. | |
| 2009/0180355 A1 * | 7/2009 | Cartwright | G04G 21/00 368/12 |
| 2009/0231960 A1 * | 9/2009 | Hutcheson | G04G 17/04 368/10 |
| 2009/0280861 A1 | 11/2009 | Khan | |
| 2010/0199232 A1 * | 8/2010 | Mistry | G06F 1/163 715/863 |
| 2011/0275906 A1 | 11/2011 | Chen | |
| 2012/0086574 A1 | 4/2012 | Blumel et al. | |
| 2013/0211204 A1 | 8/2013 | Caduff et al. | |
| 2015/0223355 A1 * | 8/2015 | Fleck | H05K 5/026 361/679.03 |

OTHER PUBLICATIONS

"Wrist Type Mobile Devices (Design -©Questel). orbit.com", <http://sobjprd.questel.fr/export/QPTUJ214/pdf2/2f78fa37-6e03-40fa-b853-941e65da78d9-175438.pdf>.

* cited by examiner

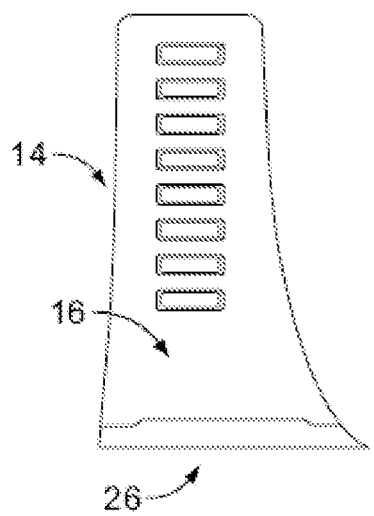
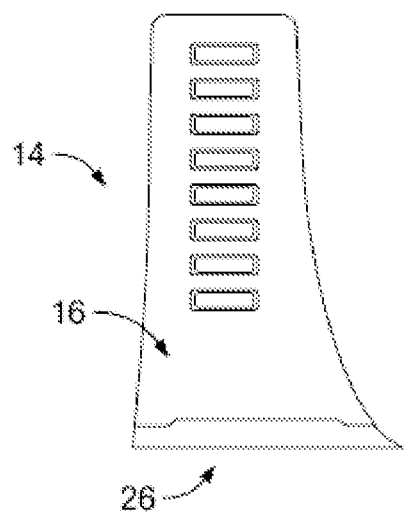
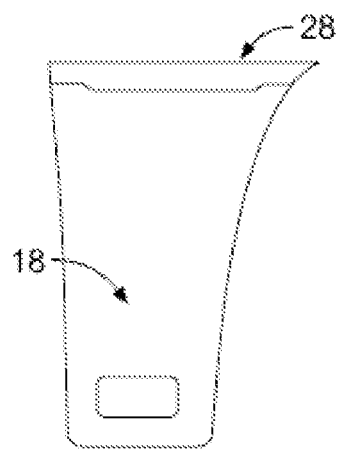
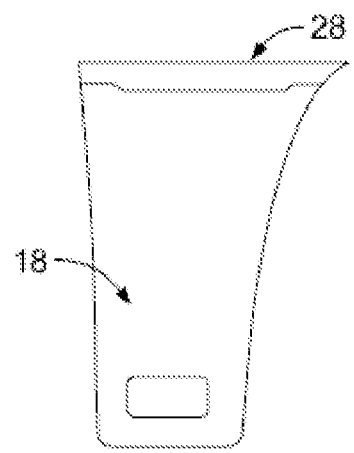
FIG. 6A
FIG. 6B
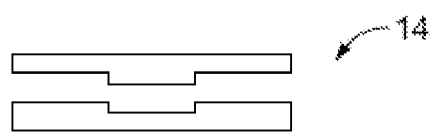
FIG. 6C

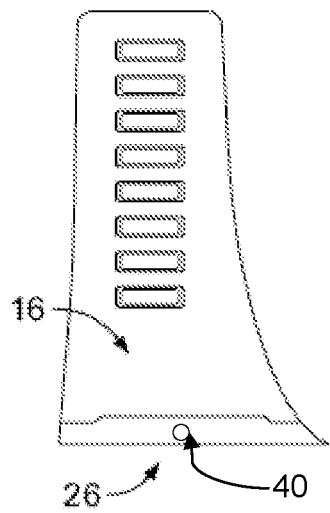
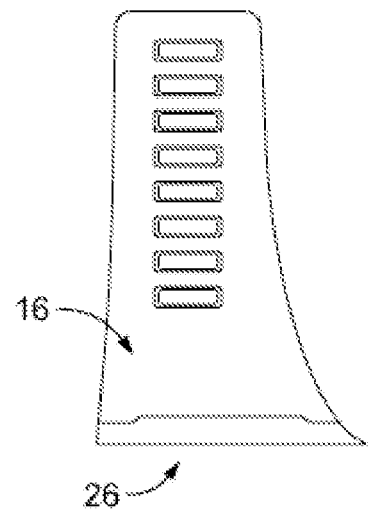
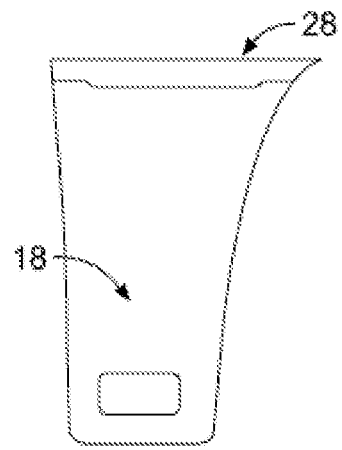
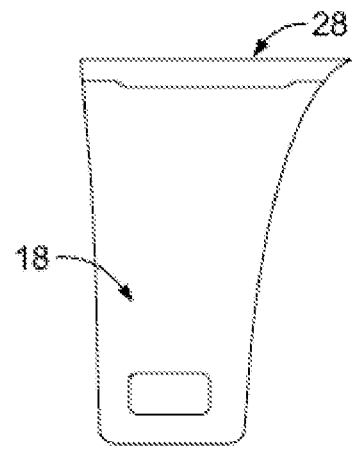
FIG. 7A  FIG. 7B
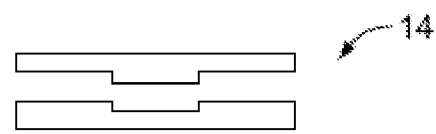
FIG. 7C

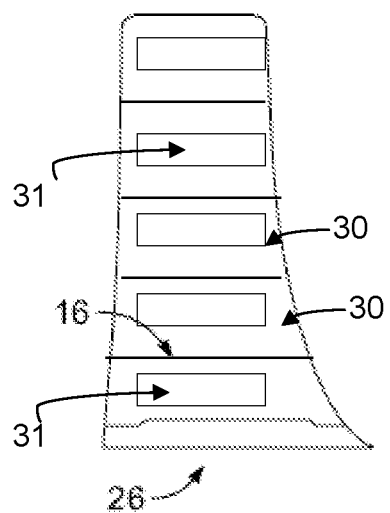
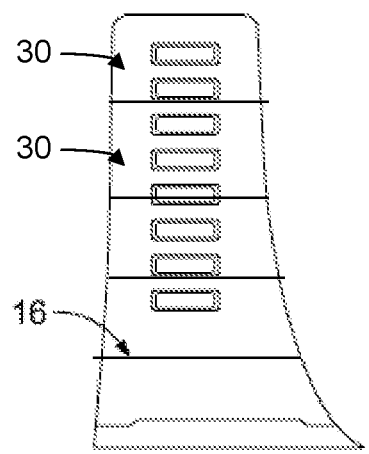
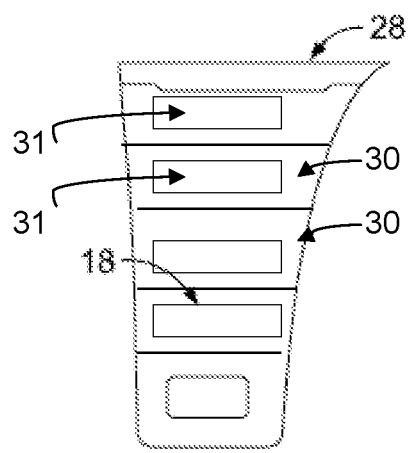
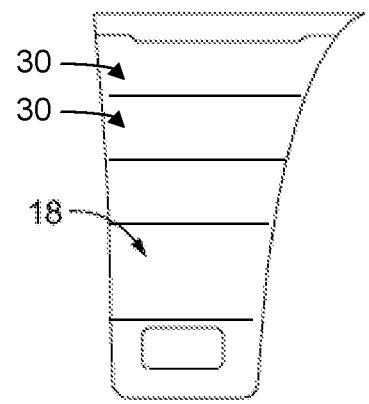
FIG. 8A
FIG. 8B
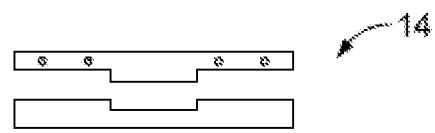
FIG. 8C

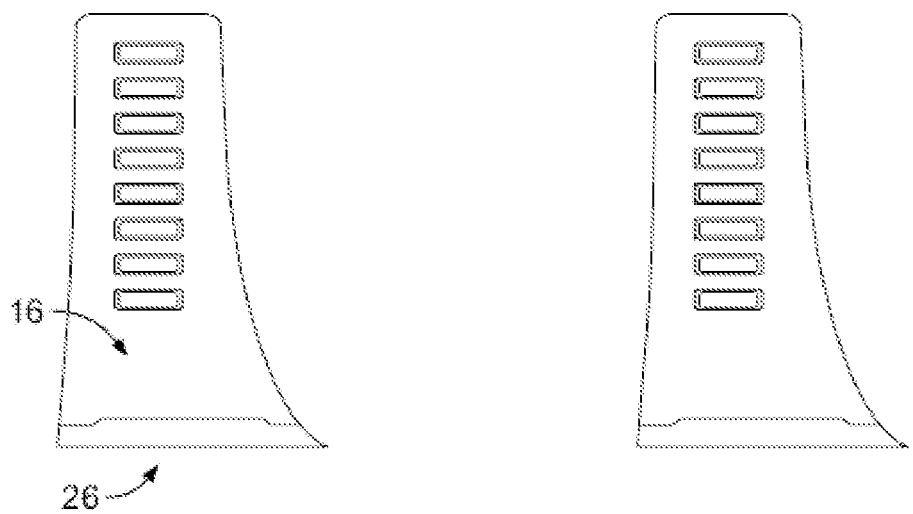
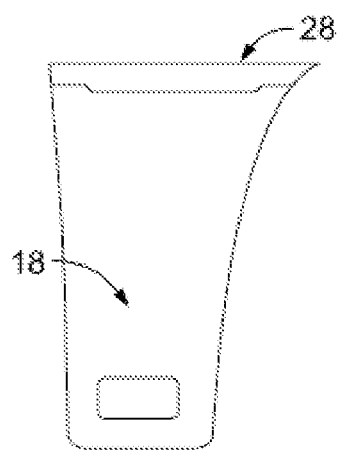
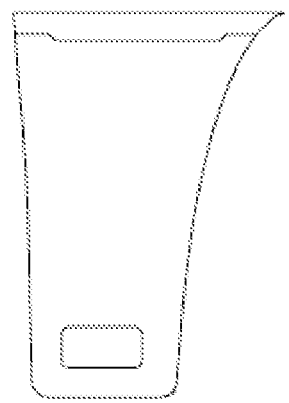
FIG. 9A
FIG. 9B
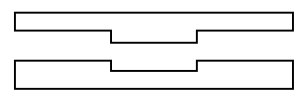
FIG. 9C

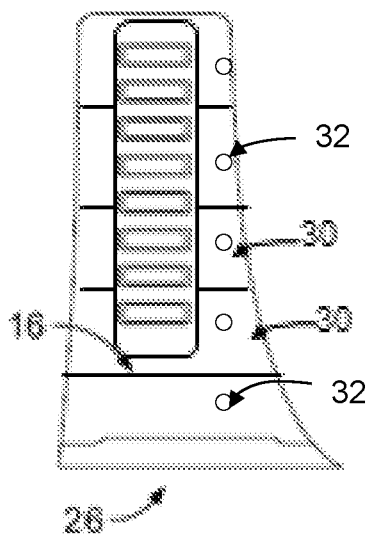
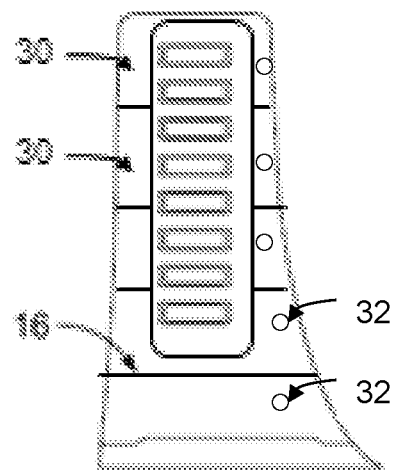
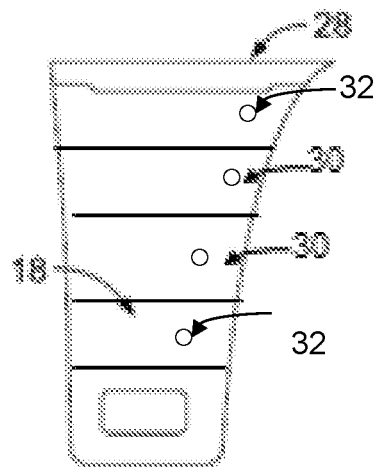
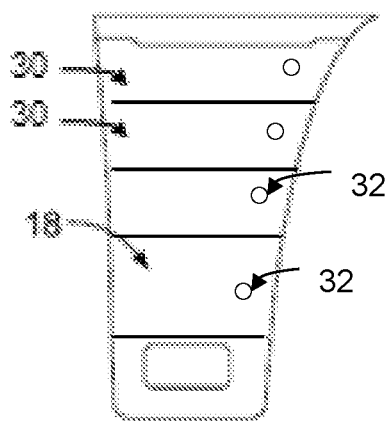
FIG. 10A  FIG. 10B
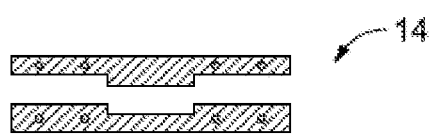
FIG. 10C

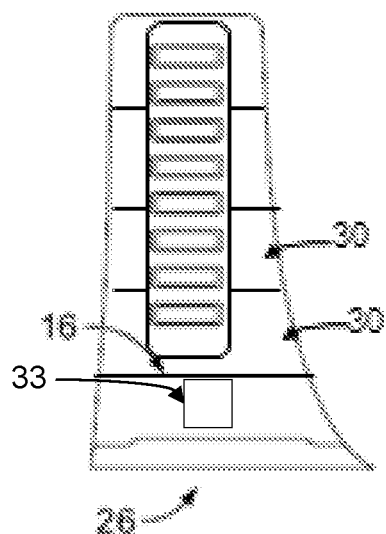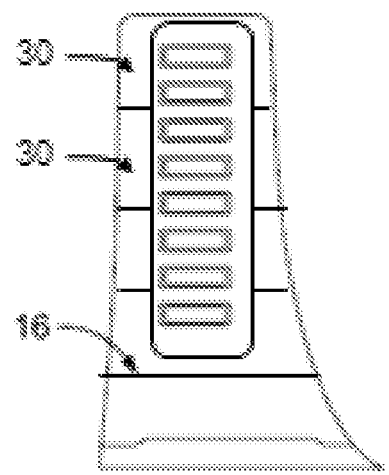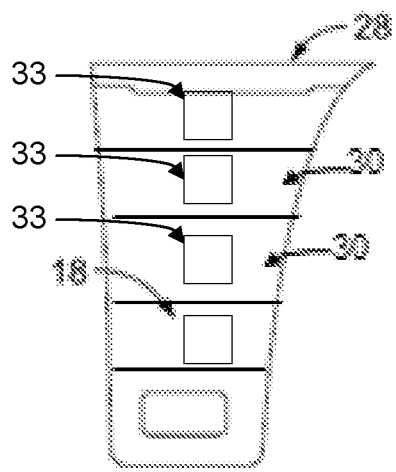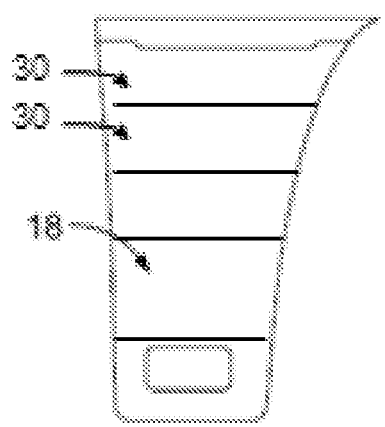
FIG. 11A　　　　　　　　FIG. 11B
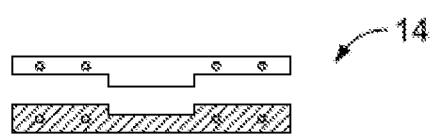
FIG. 11C

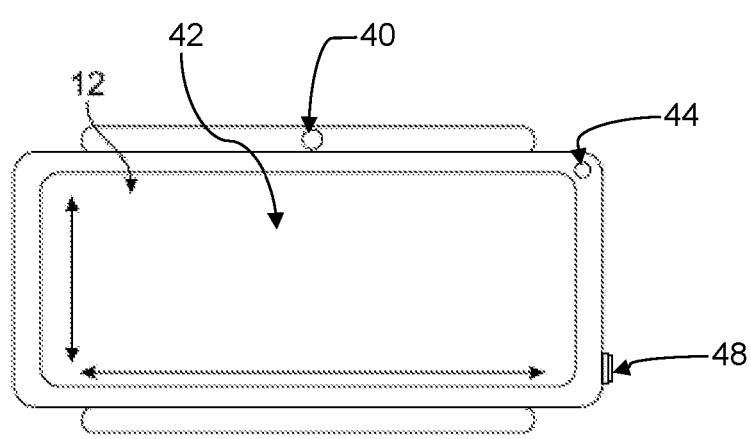
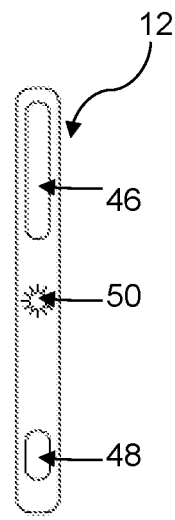
FIG. 12
FIG. 14A
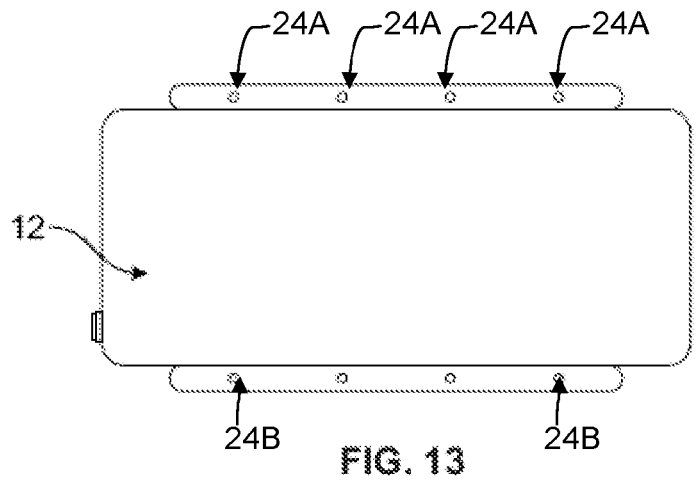
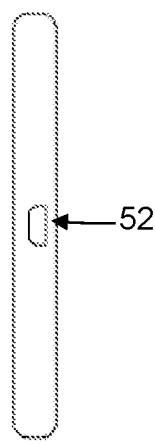
FIG. 13
FIG. 14B

WEARABLE MOBILE DEVICE

CROSS REFERENCE TO RELATED APPLICATIONS

This application claims the benefit of U.S. Provisional App. No. 61/771,739, filed Mar. 1, 2013, and U.S. patent application Ser. No. 29/478,913, filed Jan. 9, 2014, which are incorporated by reference.

FIELD OF THE INVENTION

The present invention relates generally to mobile devices and, more particularly, to mobile devices worn by the user.

BACKGROUND OF THE INVENTION

Traditionally, mobile devices, such as personal digital assistants (PDAs), portable media players, mobile phones, and digital cameras, were designed to provide a particular or a narrow range of features. With advancement in computing capability and connectivity, many such features have been consolidated into advanced mobile devices. For example, current smartphones combine the functions of personal digital assistants (PDA), mobile phones, portable media players, digital video cameras, GPS navigation units, among other functions. Many smartphones further include email, text messaging, and social networking applications.

As a result, users are commonly bombarded with notifications from their devices in the form of vibrations and sound alerts. Thus, pulling a smart phone to check the text or an e-mail has become a frequent occurrence to the annoyance of many. Wearable devices have been used in the past; however, many such devices lack features that users desire.

It should therefore be appreciated that there remains a need for a mobile device that is quickly accessible, without inhibiting functionality.

SUMMARY OF THE INVENTION

Briefly, and in general terms, the invention provides a mobile device configured to be worn about a user's wrist, providing the user with convenient access to the features of the device. The mobile device includes a display module that detachably couples to a wrap module.

More specifically, by example and not limitation, the mobile device includes interconnection between the wrap module and the display module that provides data and power conductivity there between. In this manner, the wrap module can provide supplemental functionality, such as serving as an input device (touch), a power source, or a solar charger, among other features.

In a detailed aspect of an exemplary embodiment, the wrap module includes two separate bands. Each band includes a coupler bar that mates with a corresponding side of the display module. The connection between the coupler bars and the display module forms a physical connection as well as facilitating data and power conductivity.

The coupler bar includes a plurality of screws that mate with corresponding threaded apertures defined along the corresponding sides of the display module. The screws themselves provide data and power conductivity between the display module and the wrap module. Moreover, the screws are mounted along the coupler bar to facilitate data and power conductivity to relevant components confined within the wrap module.

In another embodiment, conductive metal rods on the display module can be used to couple with corresponding contacts on the wrap module to provide data and power conductivity between the display module and the wrap module.

In yet another embodiment, the data and power interconnection and the physical coupling of the display module and the wrap module need not be co-located. For example, the wrap module can be formed of the unitary strap that includes a central dock for receiving the display module and further having straps coupled to the central dock to secure the wrap around the user's wrist, arm, or the like.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which:

FIGS. 6 A-C depict front, back and cross-sectional views of the wrap module of the mobile device of FIG. 1.

FIGS. 7A-C depict front, back and cross-sectional views of yet another embodiment of a wrap module for use with a mobile device in accordance with the invention, the wrap module can be used with the display device of FIG. 1.

FIGS. 8A-C depict front, back and cross-sectional views of another embodiment of a wrap module for use with a mobile device in accordance with the invention, the wrap module can be used with the display device of FIG. 1, further providing touch panels along the upper and lower bands as an additional input device of the display module.

FIGS. 9A-C depict front, back and cross-sectional views of yet another embodiment of a wrap module for use with a mobile device in accordance with the invention, the wrap module can be used with the display device of FIG. 1.

FIGS. 10A-C depict front, back and cross-sectional views of yet another embodiment of a wrap module for use with a mobile device in accordance with the invention, the wrap module can be used with the display device of FIG. 1, further providing batteries along the upper and lower bands as an additional power source of the display module.

FIGS. 11A-C depict front, back and cross-sectional views of yet another embodiment of a wrap module for use with a mobile device in accordance with the invention, the wrap module can be used with the display device of FIG. 1, further providing solar panels and batteries along the upper and lower bands as an additional power source of the display module.

FIG. 12 is a front view of the display module and the wrap couplers of a mobile device in accordance with the invention; the coupler of the upper band of the wrap module includes a video camera embedded in the coupler bar.

FIG. 13 is a back view of the display module and the wrap couplers of FIG. 6, indicating that the screw connections further enable digital and electrical conductivity between the display module and the wrap module.

FIGS. 14 A and B depict right and left side views of the display module of the mobile device of FIG. 1.

DETAILED DESCRIPTION OF EXEMPLARY EMBODIMENTS

Figure 1:
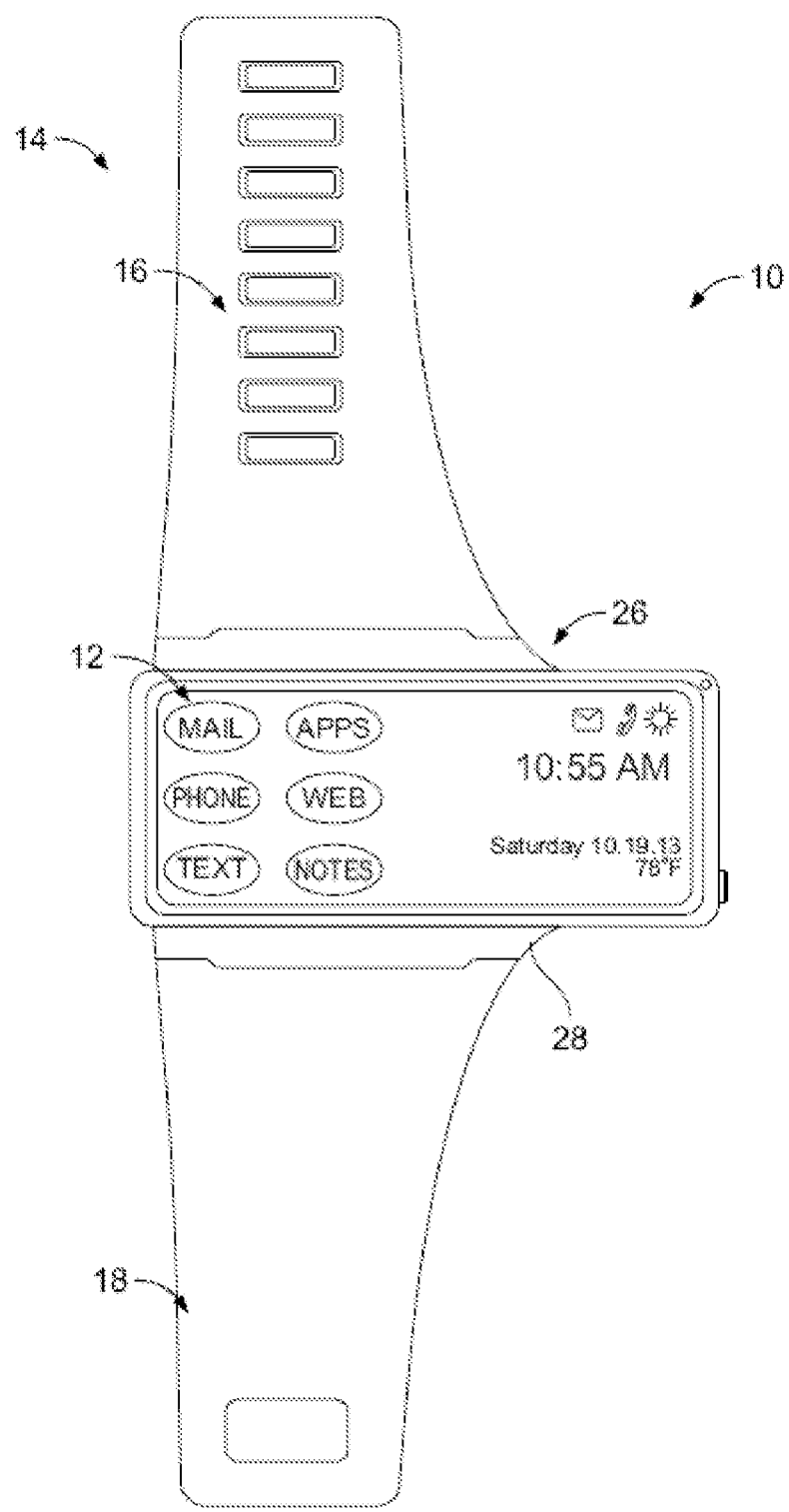
FIG. 1 is a front view of a mobile device in accordance with the invention, depicting a detachable display module attached to a wrap module.

Referring now to the drawings, and particularly FIG. 1, there is shown a wearable mobile device 10 configured to be worn about a user's wrist, providing the user with convenient access to the features of the device. More particularly, the mobile device connects to the user's smart phone via wireless communication (e.g., Bluetooth) to provide immediate notification of features such as e-mail, text, alerts, calendar, phone calls, social media feeds, and so on, without requiring the user to fetch the smart phone.

The mobile device includes a display module 12 detachably coupled to a wrap module 14. The wrap module includes a first band 16 and a second band 18, each attached to opposing sides of the display module. The mobile device includes interconnection between the wrap module and the display module that provides data and power conductivity therebetween. In this manner, the wrap module can serve as an input device and a power source, among other features, as discussed in detail below.

Figure 2:
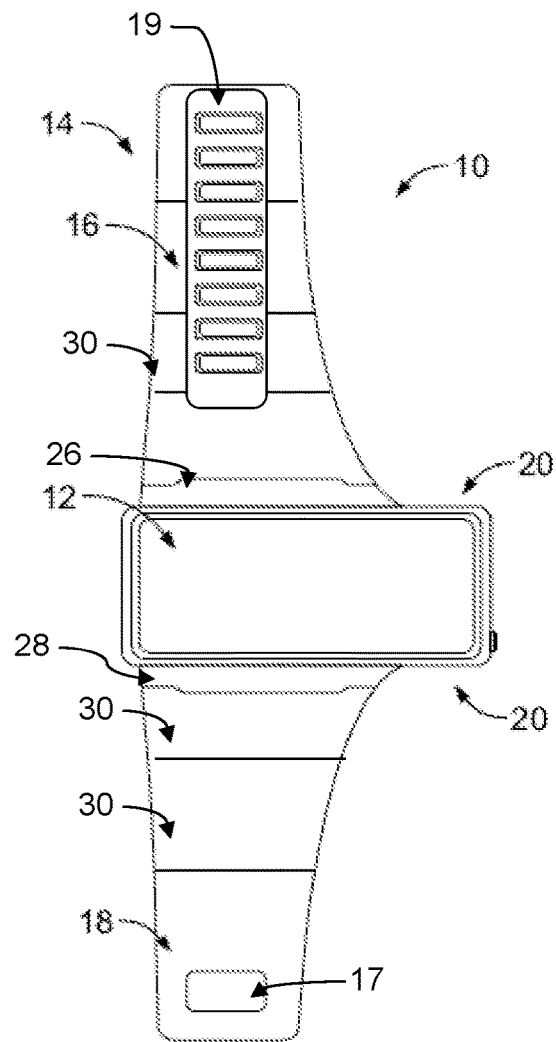
FIG. 2 is a front view of the mobile device of FIG. 1, the wrap module includes coupler bars that attach to display module.
Figure 3:
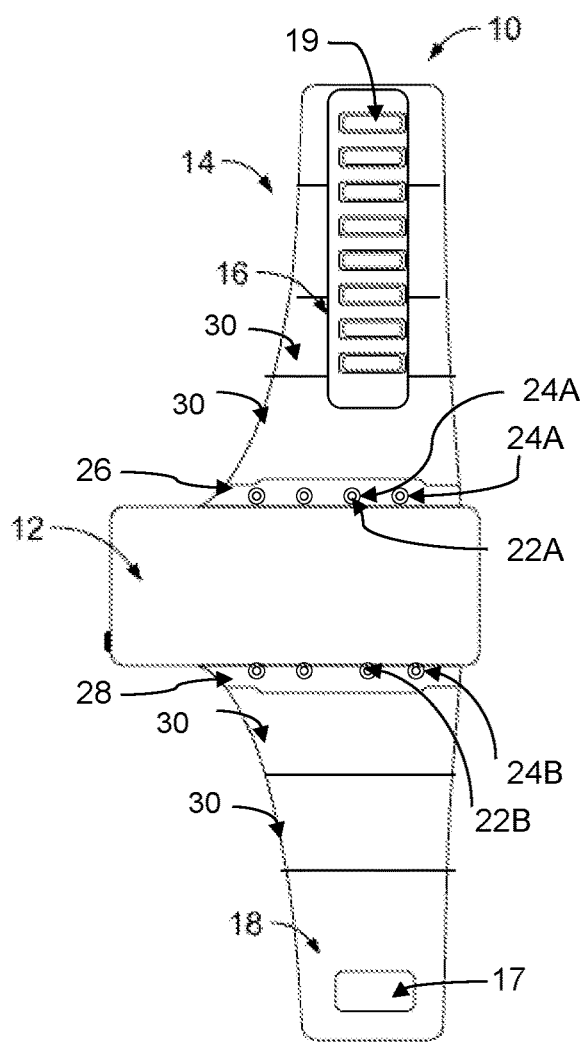
FIG. 3 is a back view of the mobile device of FIG. 1, the couplers include screws that engage corresponded treaded apertures along upper and lower sides of the display module.
Figure 23:
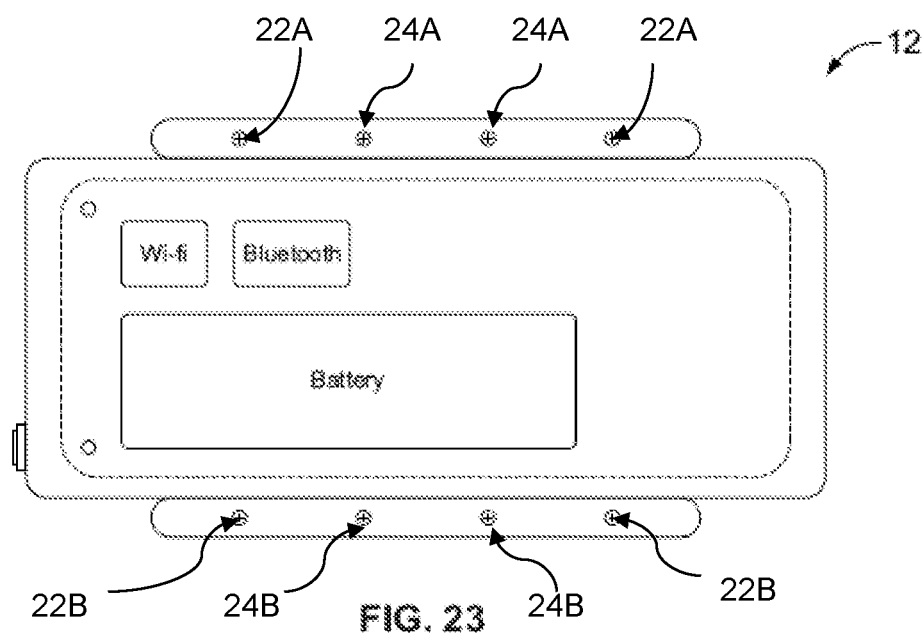
FIG. 23 is a back view of the display module and coupler bars of the mobile device of FIG. 1.
Figure 24:
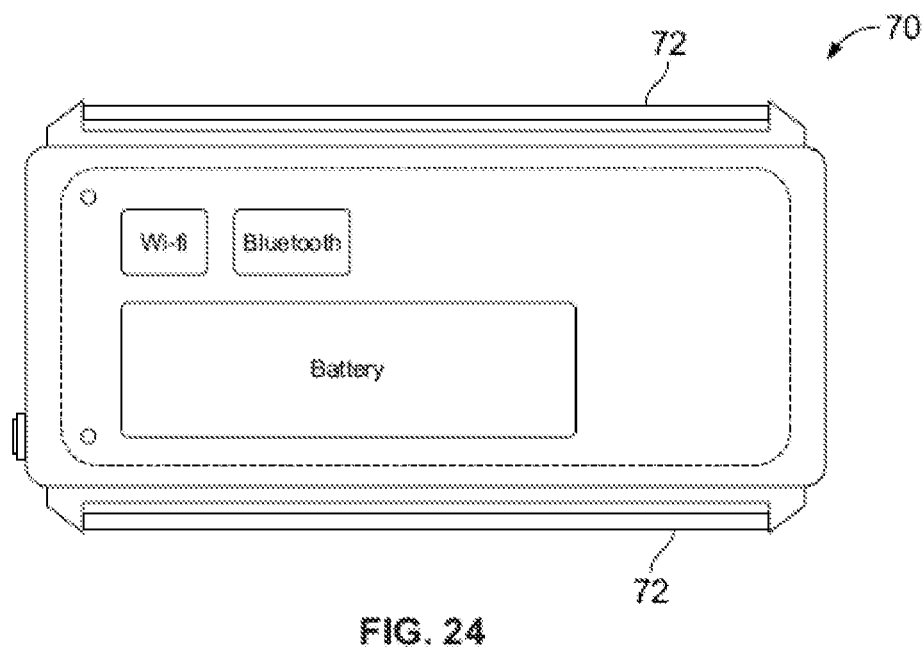
FIG. 24 is a back view of the display module of the mobile device of FIG. 19.

With reference now to FIGS. 2 and 3, the wrap module 14 includes two separate bands 16, 18. Each band includes a coupler bar 26, 28 that mates with a corresponding side of the display module. The connection between the coupler bars and the display module forms a physical connection as well as facilitating data and power conductivity. The coupler bar includes a plurality of screws (22 A, B) that mate with corresponding threaded apertures (24A, B) defined along the corresponding sides of the display module. In the exemplary embodiment, the screws themselves provide data and power conductivity between the display module and the wrap module. As shown also in FIG. 23, the threaded apertures are physically coupled to components within the display module to facilitate data and power conductivity. Moreover, the screws are mounted along the coupler bar to facilitate data and power conductivity to relevant components confined within the wrap module. Functional features of the wrap module are discussed in further detail below, e.g., with reference to FIGS. 6 and 10A-13C.

The screws need not serve as the sole means for data and power conductivity between the display module and the wrap module. For example, interconnection of the modules can further include pin interconnection ports in addition to the screws. Such ports can be propriety port or industry standard ports (e.g., USB, parallel ports, PDMI, among others). Alternatively, in another embodiment, the screws can be used solely to provide a physical connection between the modules while further having a port interface at the coupling bars. Again, such ports can be propriety ports or industry standard ports.

In another embodiment, a conductive rod or pin (e.g., metal) can be used to provide data and power conductivity between the display module and the wrap module, as well as physical connection therebetween, e.g., as shown in FIGS. 19A-21 and 24. The display module 70 includes conductive rods 72 disposed on opposing longitudinal sides that couple with corresponding first and second band of the wrap module 74. Each band includes an attachment 76 that couples to the corresponding conductive rod. The attachment includes contact points to form power and data conductivity between the band and the display module via the conductive rod. In the exemplary embodiment, the attachment connects to the conductive rod via snap fit arrangement. Alternatively, the attachment can be configured as an aperture through which a conductive rod must pass through to couple together.

In the exemplary embodiment, each band of the wrap module 74 includes a plurality of links 78 that couple to one another in a manner forming power and data conductivity therebetween. More particularly, each link 78 includes a conductive rod 80 (FIG. 21) on the distal end and a snap-fit attachment 82 on the proximal end configured in a manner similar to that discussed above, providing power and data conductivity therebetween.

In yet other embodiments, the data and power interconnection and the physical coupling of the display module and the wrap module need not be co-located. For example, the wrap module can be formed of a unitary strap that includes a central dock for receiving the display module and further having straps coupled to the central dock to secure the wrap around the user's wrist, arm, or the like. The central dock includes contacts that mate with corresponding contacts on the display module for power and data conductivity.

For example, in yet another embodiment, the display module can include exposed contacts on the underside. The wrap module, in this instance, connects to the display module via the underside contacts in a similar fashion as the rods—both sides would have exposed contacts that when fastened form a complete connection.

Figure 4:
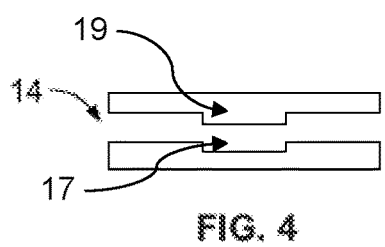
FIG. 4 is a cross sectional view of the wrap module of the mobile device of FIG. 1, depicting a magnetic attachment mechanism for securing the bands of the wrap module about a user's wrist.
Figure 5A:
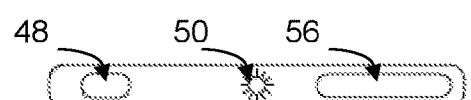
FIGS. 5 A and B depict right and left side views of the display module of the mobile device of FIG. 1.
Figure 5B:

With reference now to FIGS. 2-4, the two bands 16, 18 couple via a magnetic fastener having a "tongue-and-groove" configuration. The outer surface of the lower band 18 (FIG. 2) defines a groove 17 configured to receive a corresponding ridge (tongue) 19 defined by the inner surface of the upper band 16 (FIG. 3). The magnetic fastener includes a plurality of magnets spaced along the length of the corresponding tongue and groove, to enable the wrap module to fit in across a wide range of various sizes. In other embodiments, other fastening mechanisms can be used to secure the wrap assembly about the user's wrist. The bands 16, 18 include links 30 that can be formed from various types of material such as rubber (FIGS. 7A-7C) or metal (FIGS. 8A-8C), plastic, vinyl, elastomeric material, leather, and so on. The links extend from the coupling bars 26, 28. The links can supply additional functionality for the mobile device.

Figure 25:
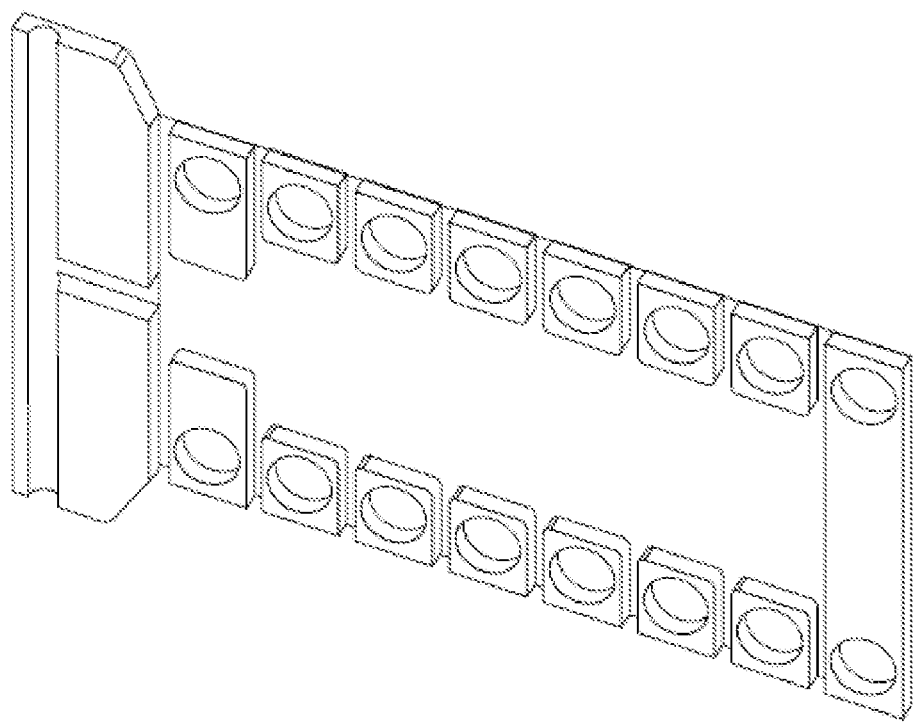
FIG. 25 is a split cross-section view of a band of a wrap module of a mobile device in accordance with the invention, depicting a unitary outer wall portion of a first band of a wrap module having two bands.

With reference now to FIG. 25, an outer wall portion of a band of a wrap module in accordance with the invention is shown. The outer wall portion includes a recess that aids in connecting with a conductive rod of a display module (such as, the conductive rod 72 of display module 70 of FIG. 17 et al.). Each band includes the outer wall and a similarly configured inner wall. The bands couple around the wrist using a magnetic attachment. The outer wall includes recesses for receiving magnets to form a magnetic attachment between first band and a second band of the wrap module. Each band includes a recessed area between the outer walls to be used for wiring, batteries, touch panel circuitry, and any other embodiments discussed herein.

With reference now to FIGS. 8A-C, links of the wrap module can be configured for gestural support. More particularly, one or more of the links 30 includes touch panels 31 along the outer surface of each link. In this manner, the wrap module can serve as an input device for the mobile device. Moreover, the mobile device can connect wirelessly to other devices. Thus, the wrap module can further operate as an input device for other such devices via the wireless connection. Flexible wiring runs through the links to the coupling bars, which connect to the display module.

In the exemplary embodiment, each link includes a single touch panel that can detect multiple contact points and movements simultaneously (aka, multi-touch). In alternative embodiments, the wrap can be provided with touch panels that sense a single touch (aka, single touch). It will further be appreciated that combinations of such touch panels can be used. The bands include links that can be formed from various types of material such as rubber, metal, plastic, (FIGS. 9A-9C), among others. The bands can be clear and can include LED lights spaced throughout.

The touch panels thereby provide convenient control for the wearer. Gestures on the touch panel can control any or all functionality of the mobile device. For example, the wearer could control audio playback, application swapping, display screen manipulation, among others. Moreover, applications can be customized to work specifically with the touch panel of the wrap module. It should further be appreciated that the typing methodology can be adapted to gestural controls of the touch panels.

For example, gestural controls can include (a) swiping forward/back around the wrist for scrolling the screen, such as text, applications, (b) zoom control by swiping fingers in opposite directions around the wrist, (c) gestural handwriting, e.g., making the shape of the letter on the wrap or, alternatively, a keyboard-like approach in which links or link combinations represent letters, and (d) application specific controls such as for gaming controls. Beneficially, touch controls on the wrap module enables the user to control the mobile device without smudging the display screen or inhibiting the screen view. For example, a user can read text such as emails, web, etc., scrolling through just by using the touch band without ever inhibiting screen view. This would create a faster reading environment.

With reference now to FIGS. 10A-C, the wrap module can include rechargeable batteries 32 to provide extended life to the mobile device. Any various approaches can be used to secure the rechargeable batteries along the bands of the wrap module. In the exemplary embodiment, individual batteries 32 are combined within each link 30. Flexible wiring runs throughout the links to the coupling bars thereby providing power to the display module. For charging, the display module can be coupled to a charging source via a port 52 (e.g., micro USB) provided on the display module (FIG. 14 B), which will charge both the battery embedded in the display module as well as the batteries of the wrap module. The power distribution between the display module and the wrap module both for charge and discharge can be controlled by the operating system, if desired. Alternatively, the wrap module can be provided with its own port (not shown) to charge independent of the display module. It is further noted a wrap module can be provided with both touch panels and batteries.

With reference now to FIGS. 11 A-C, the wrap module can be configured to recharge via solar panels 33 disposed along the outer surface of the links 30. The solar panels can be used to charge batteries enclosed in the wrap module, as well as batteries of the display module. Alternatively, batteries can be excluded from the wrap module thereby solar panels would be used merely to charge the battery of the display module. In selected embodiments, the solar panels can be combined with touch panel functionality without departing from the invention.

With reference now to FIG. 7A, the coupling bars 26, 28 of the wrap module can include a digital camera 40. With reference now to FIGS. 12-14B, the display module includes a color touch display 42; having dimensions of 3.625 inches by 1.625 inches, (different dimensions can be used in other embodiments). The touchscreen is configured to be resistant of scratches and breakage, utilizing damage resistant glass such as that available from Corning Incorporated under the brand name Gorilla® glass. Alternatively, a camera 40 can be provided by the display module 12.

The touch display is surrounded by a case, which is formed of hard rubber, metal, or other materials, with a microphone 44 disposed in an upper right corner of the front of the display module. As shown in FIGS. 14A and 14B, the right side of the display module 12 includes a speaker 46, a "ComLink" button 48, and an LED light 50. The display module further includes the port 52 (e.g., micro USB) on the left side of the module (FIG. 14B), to facilitate power charging and data transfer (e.g., software updates and digital media transfer).

In the exemplary embodiment, each threaded aperture 24 (armored thread) is connected to the board circuitry of the display module to facilitate power and/or digital communication with the wrap module. The threaded apertures are located along the upper and lower sides of the display module, such that the corresponding screws are received transverse to the sidewall, parallel to the face of the touch screen.

As mentioned above, the display module includes wireless communications, e.g., including cellular communications, Wi-Fi, and Bluetooth, enabling Internet connection as well was communications with other mobile devices such as smartphones. Cellular communications can be configured for voice and/or data. As such, the mobile device 10 can provide a wide range of functionalities independent of any other mobile devices. In addition, it can take advantage of functionalities embedded in other such mobile devices e.g. smart phones, without requiring the user to directly handle the device. For example, the mobile device can be used to place and answer phone calls received by a user's smart phone via Bluetooth communications. Moreover, users can manipulate software applications on the user smart phone through the mobile device 10.

The microphone 44 can be used for any number of functions, for example, phone calls (e.g., cellular or VOIP), dictation (e.g., text, e-mail, or instant messaging), and audio/video recordings, among other things. Whenever the mobile device 10 is synced with the smart phone (not shown), the mobile device 10 can be configured such that the speaker 46 will ring with incoming calls. The speaker 46 can further be used to play music as well as provide navigation directions.

The button 48 provides convenient means for the user to interact with the mobile device 10 as well as interacting with a smart phone wirelessly connected thereto. For example, pressing and holding the button can activate features on the smart phone or otherwise initiate voice control communication.

Figure 15A:
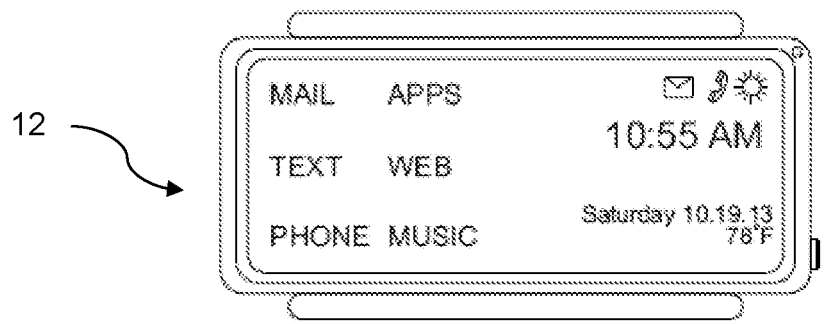
FIGS. 15A-15C are front views of the display module of the mobile device of FIG. 1, depicting various screen configurations of the display module.
Figure 15B:
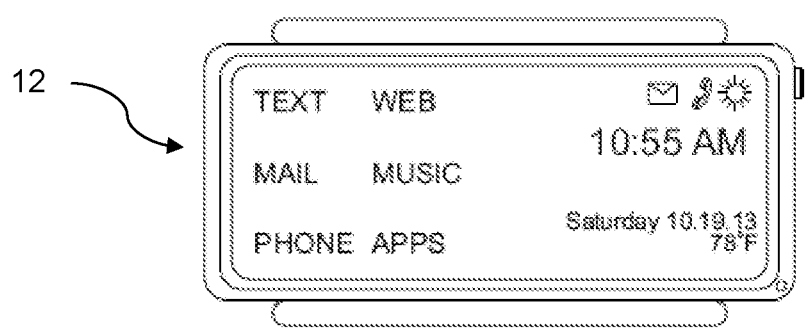
Figure 15C:
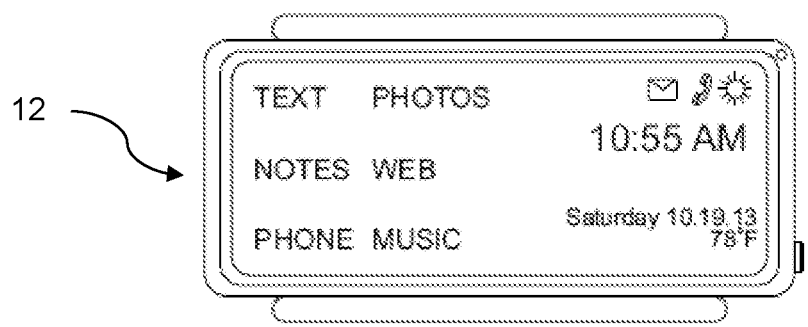

With reference now to FIGS. 15 A-C, the display module 12 can be configured with an operating system that presents information and programs to the user in an intuitive manner. In the exemplary embodiment, the various features can be found on the left of the screen and pertinent information and related icons can be located on the right portion of the screen (location swapped based on left/right wrist wearing). Along the left side of the main page, the user can access features such as mail, text, phone, apps, web access, and digital media, simply by touching the corresponding item as listed. The items can also be identified via icons (not shown). On the right of the screen, icons for phone, mail, and weather notifications are shown in the upper right directly above the time date and temperature. The screen can be customized in a manner desirable by the wearer, to include customizable, backgrounds, fonts, text, icons, and so on.

Moreover, the mobile device can be oriented to be worn on either the left wrist or the right wrist, interchangeably. For example, the user can rotate the screen orientation via gestural controls such as a two-finger clockwise or counterclockwise rotation.

Figure 16:
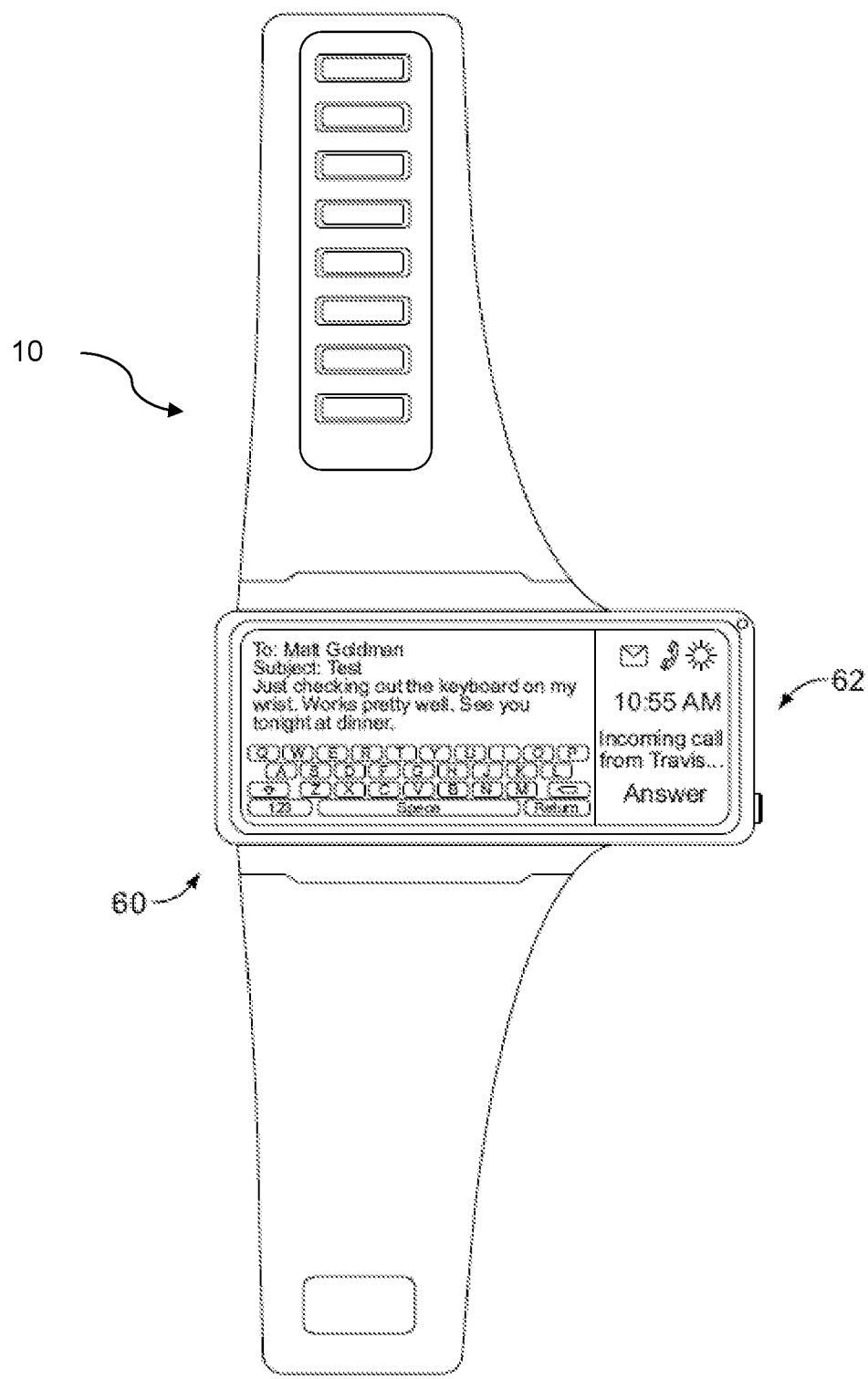
FIG. 16 is a front view of the mobile device of FIG. 1, depicting a screenshot of the display module in "Double Vision" mode with a typing panel and a notification panel.

With reference now to FIG. 16, the operating system of the mobile device 10 can provide a "double vision" mode in which the screen is divided into a work area (60) and the notification area (62). The notification area can include relevant information such as time, date, new message notifications, e.g., e-mail, text, instant messaging, incoming phone calls, and so on. The notification area can be minimized by a user input, such as the finger swipe across the screen.

Notably, the notification area is provided along the side of the display screen so that even if the user is wearing a long-sleeved shirt the user can quickly see relevant information without pulling the sleeves up. Instead, the wearer need only quickly glance at a portion of the display screen.

The work area 60 provides the user with full functionality available on the mobile device 10. For example, the user can compose messages using the screen keyboard. As mentioned above, the user can also dictate through use of the microphone, while viewing the dictation updating within the work area.

Figure 17:
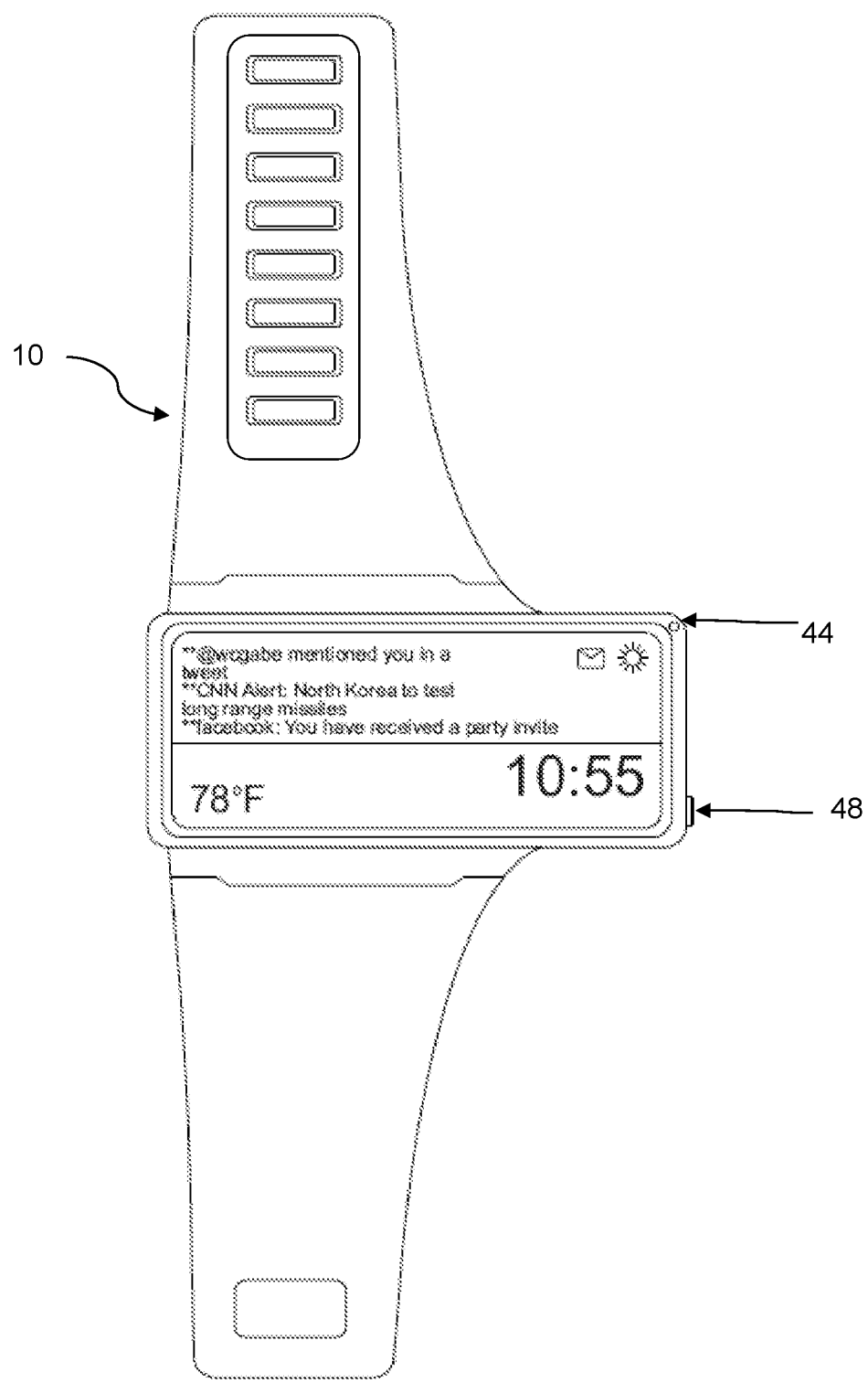
FIG. 17 is a front view of the mobile device of FIG. 1, depicting a screenshot of the display module in "Incognito" mode, allowing for a power saving mode, showing only pertinent (customizable) information on the screen such as time, weather, social media feeds and notifications.

With reference now to FIG. 17, the operating system of the mobile device 10 can also provide "incognito mode," which can take effect when the device is inactive for a prescribed amount of time. In incognito mode, the system goes into a battery saving configuration to minimize power drain. Only important (customized) alerts will be shown on the screen. In addition, the system can be configured such that LED light 50 (FIG. 14A) will remind the wearer of calendar events, incoming calls, e-mails, text or other notifications in a customizable manner. The time is located on the right side to allow easy access for viewing for the wearer. The wearer can wake the device 10 from incognito mode by pressing the "comlink" button 48, using two fingers across the screen, or with other manners.

It is also noted that the user can use the LED light 50 as an illumination device (flashlight). This feature can be activated by two-finger swipe on the left side of the screen across to the edge proximate to the LED light.

Figure 18:
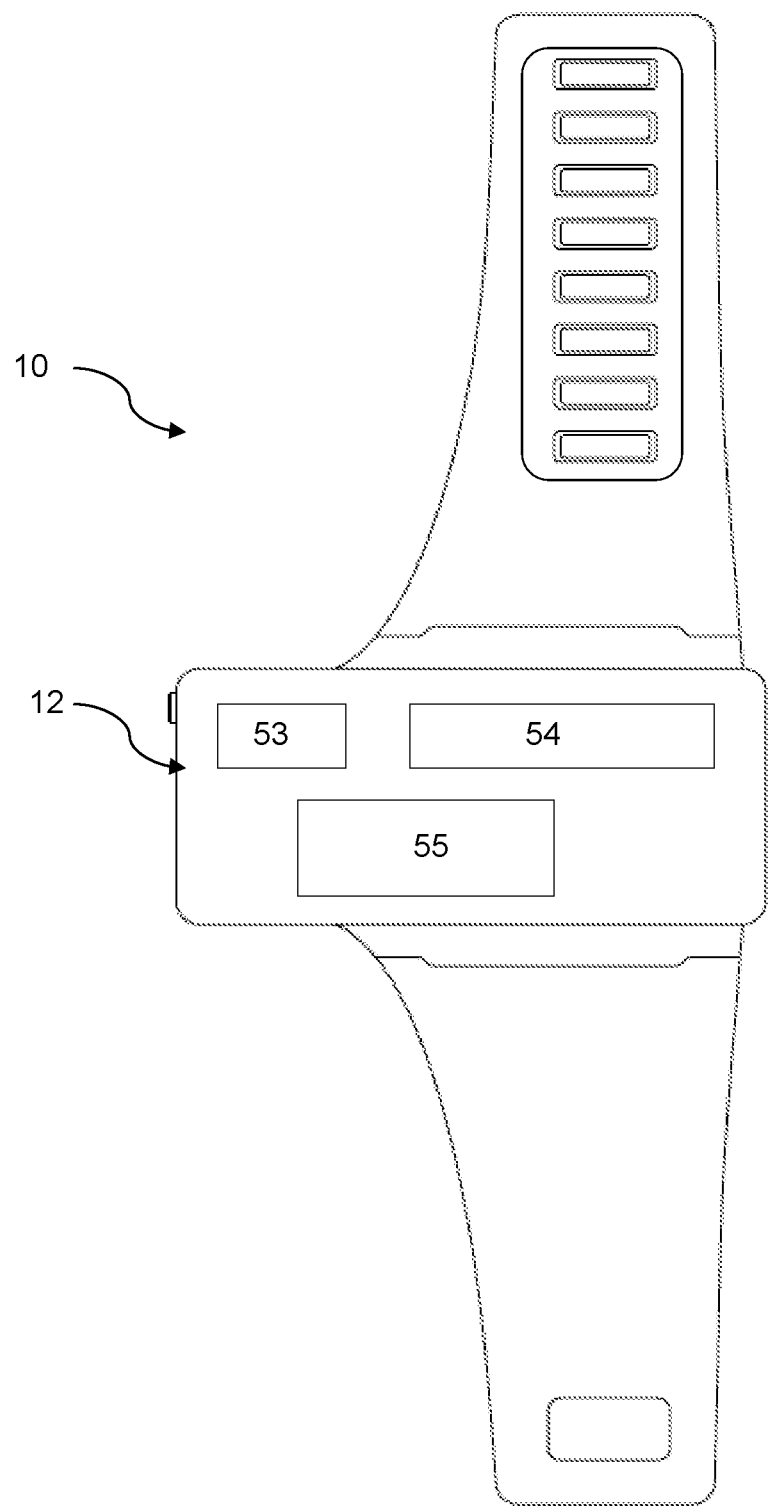
FIG. 18 is a back view of the mobile device of FIG. 1.
Figures 19A, 19B:
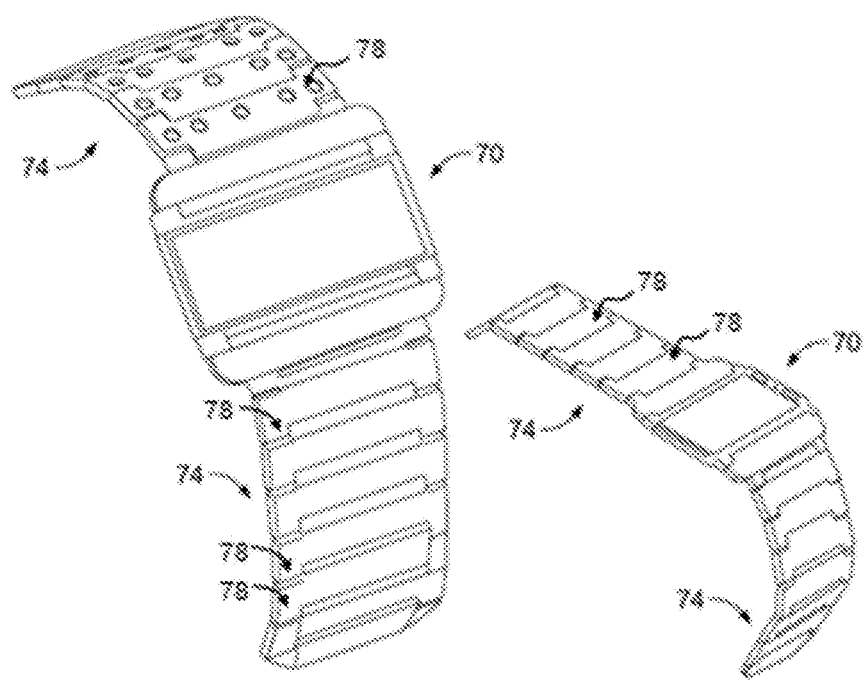
FIGS. 19A-19D are perspective views of another embodiment of a mobile device in accordance with the invention.
Figure 19C:
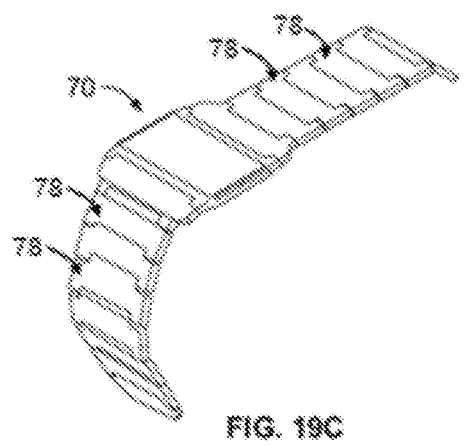
Figure 19D:
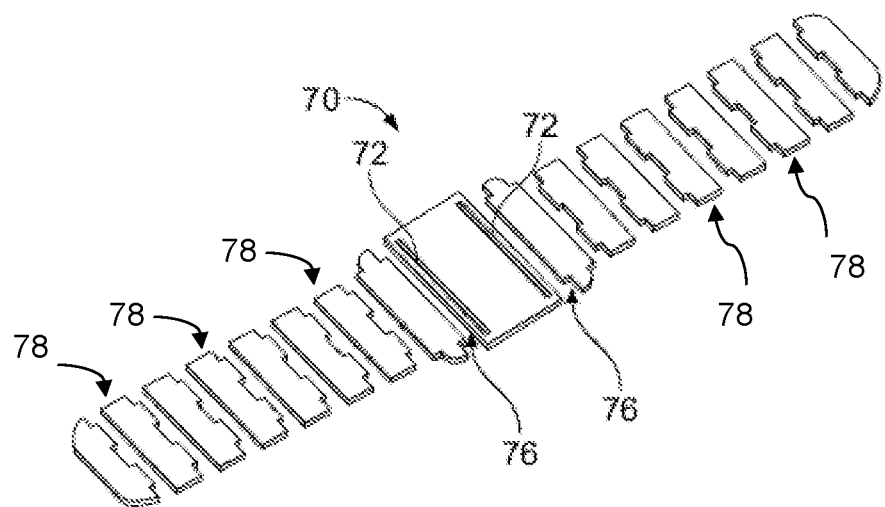
Figure 20A:
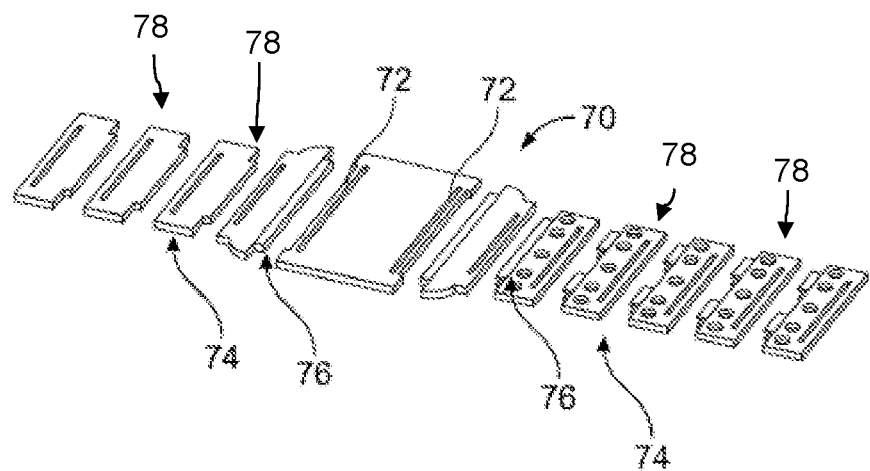
FIGS. 20A-20B are perspective views of another embodiment of a mobile device in accordance with the invention.
Figure 20B:
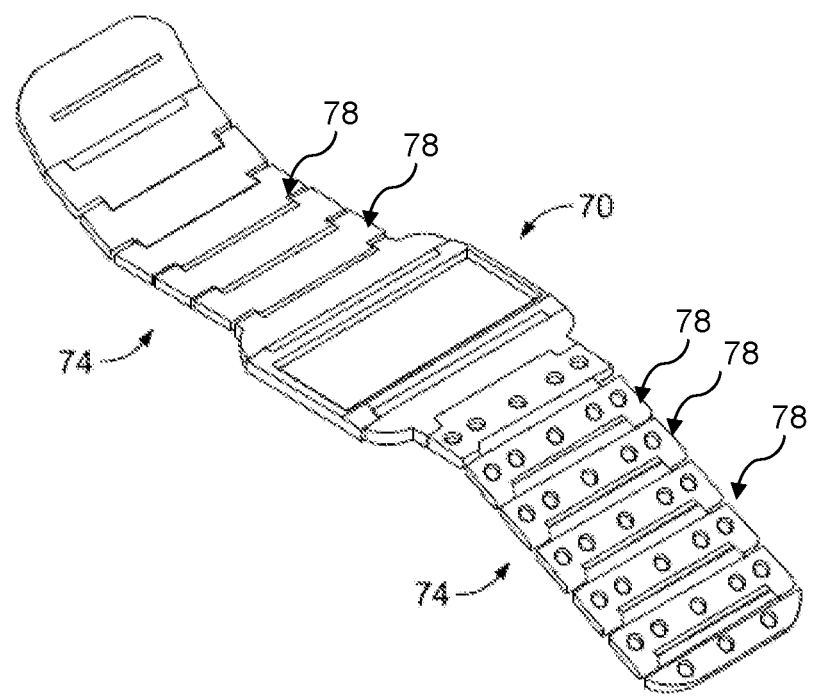
Figure 21:
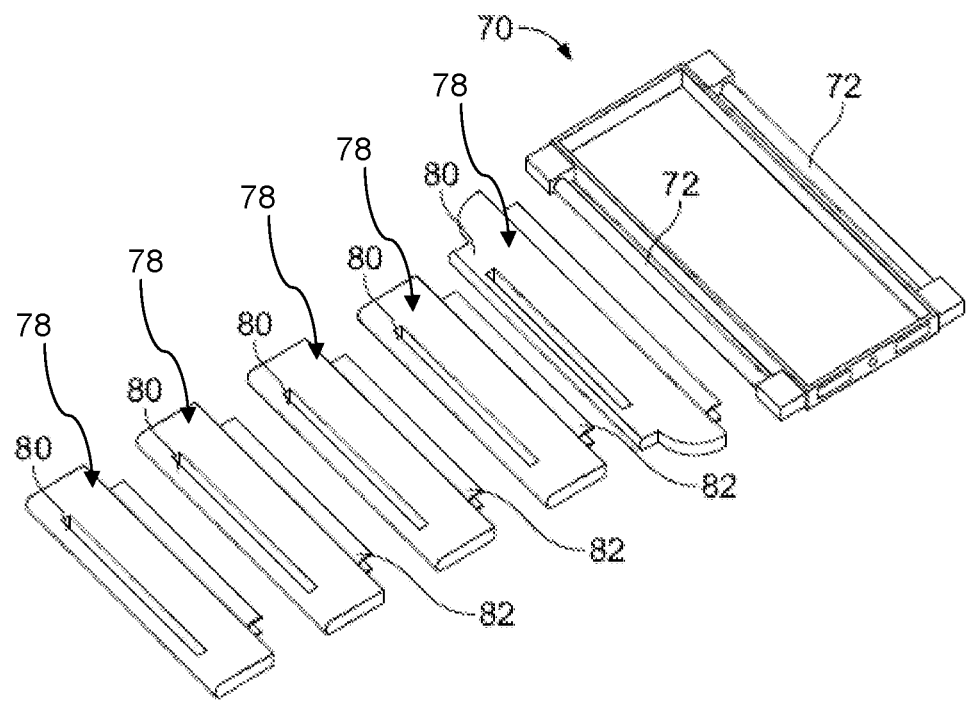
FIG. 21 is a close-up, exploded view of an interconnection between a display module and a wrap module of a mobile device in accordance with the invention.
Figure 22A:
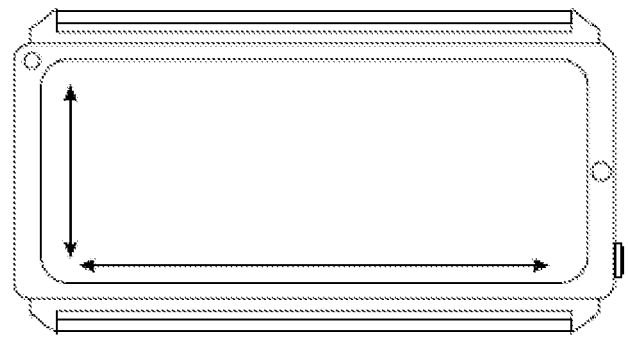
FIGS. 22A-22D are elevation views of another embodiment of a mobile device in accordance with the invention, depicting a display module that can be removed from the wrap module while worn.
Figure 22B:
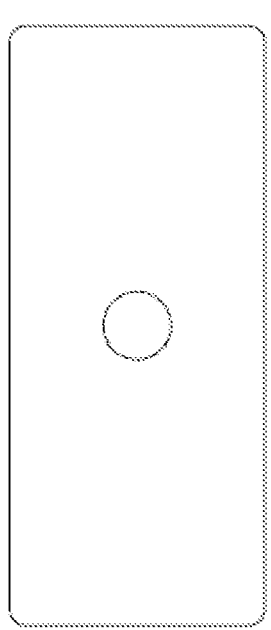
Figure 22C:
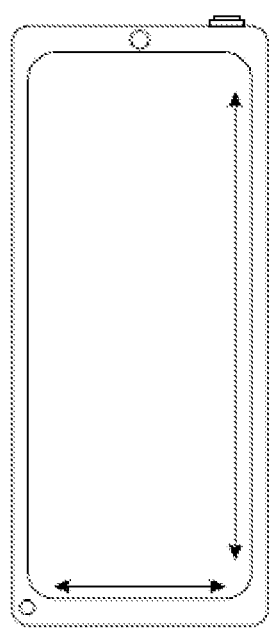
Figure 22D:
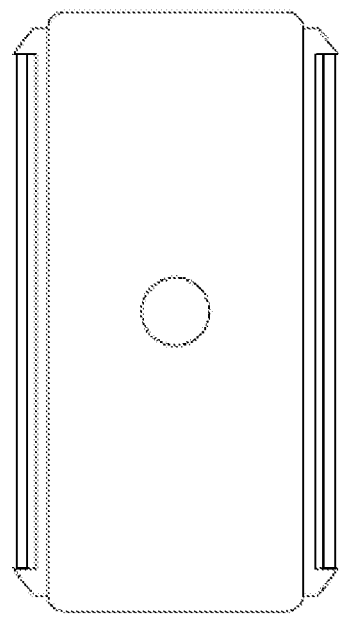

With reference now to FIG. 18, the display module 12 includes a positioning module (e.g., GPS) 53, accelerometer 54 and gyroscope 55, to provide location and orientation functionality, for use by the applications of the display module as well as other mobile devices wirelessly connected thereto. The display module can also be configured for wireless inductive charging, as is known in the art. The display module 12 further includes near field communications (NFC) built-in. For example, NFC can be provided within the wrap module. In an exemplary embodiment, a wrap module having two separate bands can include a clasp at the distal end of each band. Either or both clasps can include an NFC device therein. This could, for example, be configured to operate doors, locks, computers, or other electrical device. It could also be used to facilitate payments.

Although the invention has been disclosed in detail with reference only to the exemplary embodiments, those skilled in the art will appreciate that various other embodiments can be provided without departing from the scope of the invention, to include any and all combination of features discussed herein.

What is claimed is:

1. A wrist-worn mobile device, comprising: a display module having attachment locations for enabling data and/or power conductivity, the display module includes a touch screen and wireless communications; a wrap module that detachably couples to the attachment locations of the display module such that the data and/or power conductivity is provided between the display module and the wrap module, the wrap module is sized to secure about a user's wrist to hold the display module on the user's wrist, the wrap module includes two separate bands, each band mates with a corresponding side of the display module, the wrap module includes one or more multi-touch touch panels along an outer surface thereof, in operative communication with the display module that serves as an input device; wherein each band of the wrap module includes a plurality of links that couple to one another using a conductive rod on the distal end of one link and a snap-fit attachment on the proximal end of another link, configured in a manner forming power and data conductivity therebetween, in which each link includes one or more batteries.

2. The wearable mobile device as defined in claim 1, wherein the wrap module includes solar panels disposed along the outer surface thereof to charge batteries enclosed in the wrap module and/or batteries of the display module.

3. The wearable mobile device as defined in claim 1, wherein the touch screen is composed of damage-resistant glass.

4. The wearable mobile device as defined in claim 1, wherein the wrap module includes LED lights spaced throughout.

5. The wearable mobile device as defined in claim 1, wherein the one or more multi-touch panels of the wrap module serves an input device for the display module enabled for control audio playback, application swapping, and display screen manipulation thereof.

6. The wearable mobile device as defined in claim 1, wherein each link includes a multi-touch panel.

7. The wearable mobile device as defined in claim 6, wherein the multi-touch panels of the wrap module serves an input device for the display module enabled for control audio playback, application swapping, and display screen manipulation thereof.

8. The wearable mobile device as defined in claim 6, wherein the wrap module includes LED lights spaced throughout.

9. The wearable mobile device as defined in claim 1, wherein at least one link includes the multi-touch panel.

10. The wearable mobile device as defined in claim 9, wherein the wrap module includes LED lights spaced throughout.

11. The wearable mobile device as defined in claim 1, wherein at least one link of the plurality of links includes the multi-touch panel and at least one link of the plurality of links includes a single-touch panel.

12. The wearable mobile device as defined in claim 11, wherein the multi-touch panel and the single touch panel of the wrap module serve as input devices for the display module enabled for control audio playback, application swapping, and display screen manipulation thereof.

13. The wearable mobile device as defined in claim 1, wherein gestures on the one-or more multi-touch panel controls functionality of the display module.

14. The wearable mobile device as defined in claim 13, wherein the gestures include (a) swiping forward/back around the wrist for scrolling and (b) zoom control by swiping fingers in opposite directions around the wrist.

15. A wrist-worn mobile device, comprising: a display module having attachment locations for enabling data and/or power conductivity, the display module includes a touch screen and wireless communications; a wrap module that detachably couples to the attachment locations of the display module such that the data and/or power conductivity is provided between the display module and the wrap module, the wrap module is sized to secure about a user's wrist to hold the display module on the user's wrist, the wrap module includes two separate bands, each band mates with a corresponding side of the display module, wherein each band of the wrap module includes a plurality of links that couple to one another using a conductive rod on the distal end of one link and a snap-fit attachment on the proximal end of another link, configured in a manner forming power and data conductivity therebetween, in which each link includes a multi-touch panel, in operative communication with the display module that serves as an input device.

16. The wearable mobile device as defined in claim 15, wherein gestures on the multi-touch panels control functionality of the display module.

17. The wearable mobile device as defined in claim 16, wherein the gestures include (a) swiping forward/back around the wrist for scrolling and (b) zoom control by swiping fingers in opposite directions around the wrist.

18. The wearable mobile device as defined in claim 15, wherein the multi-touch panels of the wrap module serves an input device for the display module enabled for control audio playback, application swapping, and display screen manipulation thereof.

19. The wearable mobile device as defined in claim 15, wherein the wrap module includes LED lights spaced throughout.

* * * * *